(12) United States Patent
Yang et al.

(10) Patent No.: US 10,426,134 B2
(45) Date of Patent: Oct. 1, 2019

(54) S-SHAPED FOLDING PET DINING TABLE

(71) Applicant: ZHUHAI HENGQIN SUPER TECHNOLOGY LTD., Zhuhai, Guangdong (CN)

(72) Inventors: Tianle Yang, Guangdong (CN); Yibao Zeng, Guangdong (CN)

(73) Assignee: ZHUHAI HENGQIN SUPER TECHNOLOGY LTD., Zhuhai (CN)

( * ) Notice: Subject to any disclaimer, the term of this patent is extended or adjusted under 35 U.S.C. 154(b) by 162 days.

(21) Appl. No.: 15/658,427

(22) Filed: Jul. 25, 2017

(65) Prior Publication Data

US 2018/0317448 A1    Nov. 8, 2018

(30) Foreign Application Priority Data

May 2, 2017    (CN) .................... 2017 2 0479661 U

(51) Int. Cl.
*A01K 5/01* (2006.01)
*A01K 5/00* (2006.01)
*F16M 11/38* (2006.01)

(52) U.S. Cl.
CPC .............. *A01K 5/0114* (2013.01); *A01K 5/00* (2013.01); *F16M 11/38* (2013.01)

(58) Field of Classification Search
CPC . A47B 3/0818; A47B 2003/0821; A47B 3/08; A47B 2003/008; A47B 2003/0824; A47B 3/0803; A47B 2003/0827; A47B 23/001; A01K 5/0114; A01K 5/0135; A01K 7/005; A01K 5/0107; A01K 1/10; Y10S 16/13; E05D 9/005; E05D 1/00; E05D 7/00; E05D 7/1072; E05D 15/505; E05D 3/02; E05D 7/009; E05D 7/10; B29L 2031/22; B65D 47/0847; B65D 47/08; B65D 47/0833; B65D 2543/00379; B65D 47/0876; E05Y 2900/602
USPC ..... 108/132, 121, 125, 42, 48, 50.11, 50.12; 119/51.01, 61.5, 61.56; 16/225, 221, 372, 16/385, 386
See application file for complete search history.

(56) References Cited

U.S. PATENT DOCUMENTS

| | | | |
|---|---|---|---|
| 910,354 A * | 1/1909 | Burlingame | A47B 3/0912 100/25 |
| 5,782,185 A * | 7/1998 | Frahm | A63H 33/00 100/25 |
| 6,363,866 B1 * | 4/2002 | Schwartz | A47B 13/10 108/64 |

(Continued)

*Primary Examiner* — Kathleen I Alker
*Assistant Examiner* — Jeffrey R Larsen

(57) ABSTRACT

The disclosure provides an S-shaped folding pet dining table, which includes a tabletop made from a plastic material and two pairs of table legs mounted at bottoms of left and right ends of the tabletop respectively, wherein top of the tabletop is lying on a horizontal plane, the tabletop is bent in an S shape in plan view, and at least two feeding bowl placement holes are formed in a staggering manner according to bending of the S shape of the tabletop; and the two pairs of table legs are both positioned outside front and rear side edges of the tabletop after being oppositely folded, and the two pairs of table legs are staggered according to the bending of the S shape of the tabletop. The dining table reaches a height comfortable for a large/medium dog, the height may be maximized by virtue of a finite space, the structure is simple, and convenience for operation is achieved.

4 Claims, 6 Drawing Sheets

(56) References Cited

U.S. PATENT DOCUMENTS

| | | | | |
|---|---|---|---|---|
| 6,568,506 B1* | 5/2003 | Donnalley | ............. | A47C 12/02 |
| | | | | 108/129 |
| 2003/0121459 A1* | 7/2003 | Lou-Hao | ................ | A47B 3/091 |
| | | | | 108/129 |
| 2010/0186638 A1* | 7/2010 | Roy | ......................... | A47B 3/08 |
| | | | | 108/25 |
| 2014/0346293 A1* | 11/2014 | Qiu | ..................... | A01K 5/0114 |
| | | | | 248/176.1 |

* cited by examiner

S-SHAPED FOLDING PET DINING TABLE

CROSS-REFERENCE TO PRIOR APPLICATION

This application claims the benefit of Chinese Utility Model Application No. 201720479661.6 filed on May 2, 2017, the contents of which are incorporated herein by reference.

TECHNICAL FIELD

The disclosure relates to the technical field of pet products, and particularly to an S-shaped folding pet dining table.

BACKGROUND

Along with increasing development of economy, pet has become an important member of more and more families, and thus people pay great attentions to healthy diets of pets in daily life. A conventional pet bowl is a simple bowl body directly placed on the ground for a pet to directly use, and such a feeding manner is easy but unhealthy, and may increase a rate of incidence of cervical spondylosis because of frequent head lowering for feeding and particularly make a medium/large dog more likely to get sick. Then, pet dining tables appear on the market, on which bowls may be placed or which are directly provided with bowl bodies. These pet dining tables are usually relatively large in size, high in space occupation rate and large in packaging size particularly in a transportation process, which causes high transportation cost and inconvenience for storage.

SUMMARY

In view of those described in the background, the disclosure is intended to provide a novel dining table, which is convenient to carry and store and free of influence on use.

The purpose of the disclosure is achieved by the following technical solution.

An S-shaped folding pet dining table may include a tabletop made from a plastic material and two pairs of table legs mounted at bottoms of left and right ends of the tabletop respectively and capable of being folded into a staggered position, wherein top of the tabletop may be lying on a horizontal plane, the tabletop may be bent in an S shape in a plan view, and at least two feeding bowl placement holes may be formed in the tabletop in a staggering manner conforming to bending of the S shape of the tabletop; and the two pairs of table legs may both be positioned outside front and rear side edges of the tabletop after being oppositely folded, and the two pairs of table legs may be staggered to conform to the bending of the S shape of the tabletop to increase a height of the dining table on a premise of not increasing a length of the tabletop.

Preferably, four male rotating shafts may be arranged in four corners of a lower part of the tabletop respectively, each male rotating shaft may have a structure of a shell, and an elastic male buckle of which three edges are open may be arranged at a lower part of each male rotating shaft; and four female rotating shafts corresponding to the four male rotating shafts of the tabletop may be arranged at an upper part of the two pairs of table legs respectively, each female rotating shaft may have a structure of a semicircular shell with a shell opening, a width of each shell opening may be smaller than a diameter of a corresponding one of the male rotating shafts, a female buckle may be arranged in each female rotating shaft, and each female buckle may be engageable with a corresponding one of the elastic male buckles of the male rotating shafts, and the elastic male buckles and the female buckles may be arranged to lock the two pairs of table legs in a folded position.

Preferably, an upper surrounding edge which protrudes upwards may be arranged along a periphery of an upper surface of the tabletop.

Preferably, a lower surrounding edge which protrudes downwards may be arranged along a periphery of a lower bottom surface of the tabletop, and the four male rotating shafts may be arranged in four corners of the lower surrounding edge respectively.

Preferably, two tabletop openings may be formed in left and right ends of the lower surrounding edge respectively, and two ribs which protrude outwards may be arranged at the two tabletop openings respectively.

Preferably, a locking buckle corresponding to each of the two tabletop openings of the lower surrounding edge may be arranged between the two female rotating shafts at each pair of table legs, the two locking buckles may be buckled to the two outwardly protruding ribs of the tabletop openings of the lower surrounding edge at a bottom of the tabletop respectively by virtue of elasticity of plastics when the two pairs of table legs are unfolded, and the two pairs of table legs which are locked may not sway, thereby ensuring stability of the dining table.

Preferably, a fastener position may be arranged in the middle of each locking buckle, and a function of the fastener positions may be that the fastener positions are pulled with hands of a user to elastically deform the plastics when the two pairs of table legs are required to be folded and the locking buckles are separated to fold the two pairs of table legs.

Preferably, each semicircular shell may be provided with a notch, and the notches may have a function of improving elasticity of the semicircular shells to sleeve the male rotating shafts of the tabletop with the female rotating shafts of the two pairs of table legs.

Compared with a conventional art, the disclosure has the following advantages:

1: an "S"-shaped modeling design is adopted, so that the table legs may be mutually staggered to form dislocation after being folded, lengths of the legs are increased, the dining table reaches a height comfortable for a large/medium dog, and the height may be maximized by virtue of a finite space;

2: the structure is simple, and mainly comprises two parts without spare components, and the left and right table legs may be commonly used, so that mold cost and production cost are reduced, and in addition, defects caused by various errors generated in a production process may also be effectively avoided because of few components;

3: simplicity for mounting and use is achieved, and during mounting, it is only necessary to clamp the rotating shafts of the table legs into the rotating shafts of the tabletop without any other auxiliary tool, so that the production efficiency may be effectively improved; in terms of use, the fastener positions are adopted for locking also without any auxiliary tool during folding and unfolding, and moreover, there is no assembling and disassembling procedure in a folding process (a similar product on the market usually realizes a similar function by disassembling table legs), so that product damage caused by an improper operation of a user is effectively reduced, service life of a product is effectively prolonged, and more convenience is brought to use; and 4: a space is maximally utilized, and a size is reduced after folding, so that packaging transportation and warehousing

DETAILED DESCRIPTION

In order to make the purpose, technical solution and advantages of the disclosure clearer, the disclosure will be further described below in detail with reference to the drawings and an embodiment. It should be understood that the specific embodiment described here is only adopted to explain the disclosure and not intended to limit the disclosure.

Figure 1:
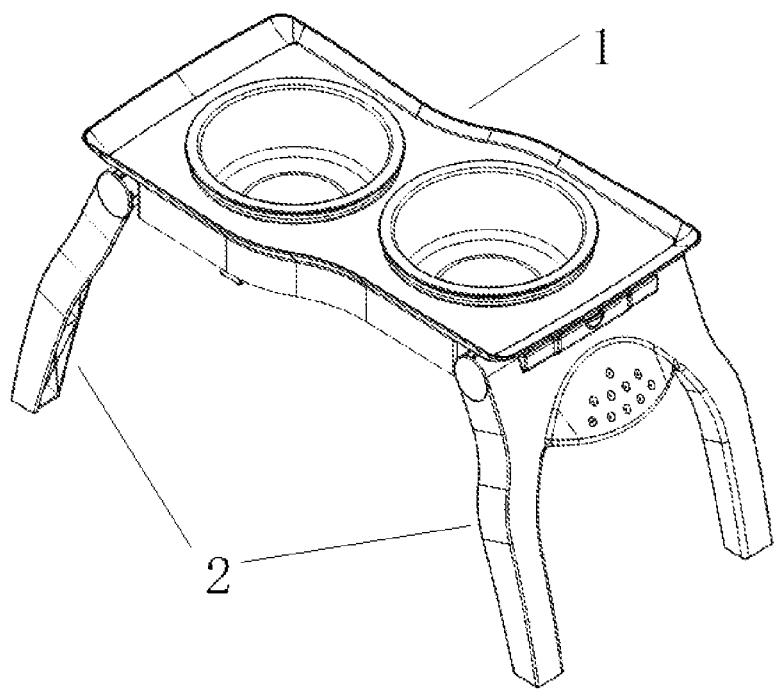
FIG. 1 and FIG. 2 are structure diagrams of an unfolded state and a folded state according to an embodiment of the disclosure.
Figure 2:
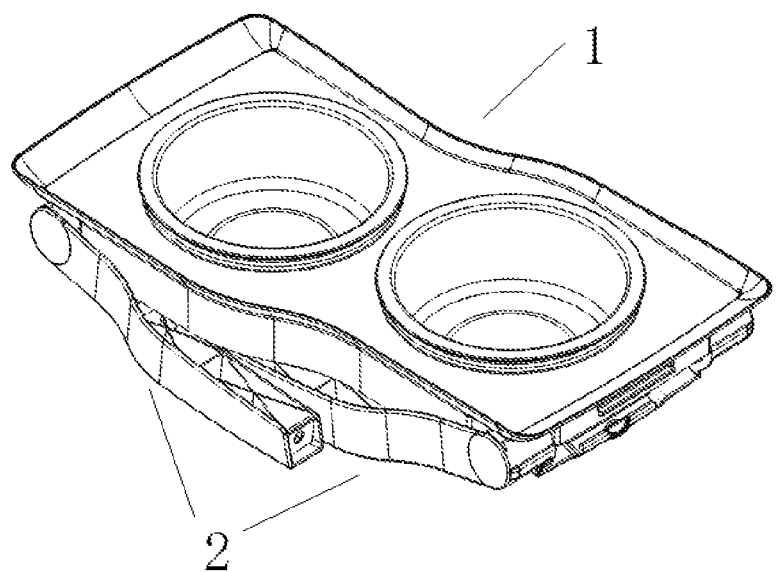

As shown in FIG. 1 and FIG. 2, The embodiment provides an S-shaped folding pet dining table, which consists of a tabletop 1 and two pairs of table legs 2 arranged at bottoms of two ends of the tabletop 1 respectively.

Figure 3:
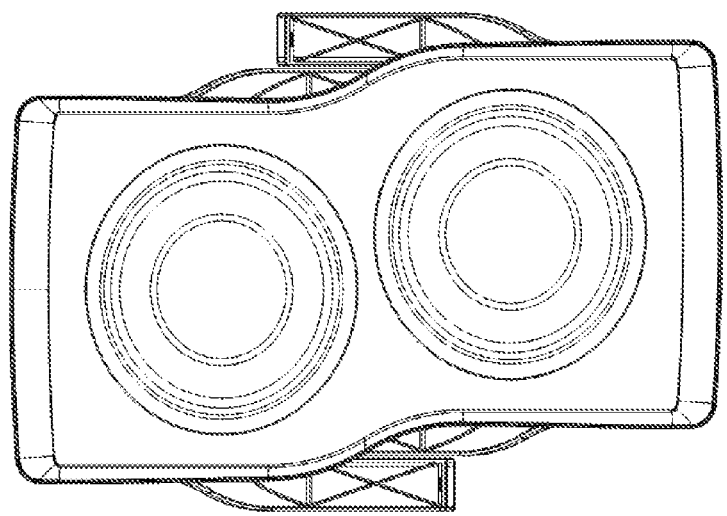
FIG. 3 and FIG. 4 are a top view and bottom view of a folded state according to an embodiment of the disclosure respectively.
Figure 4:
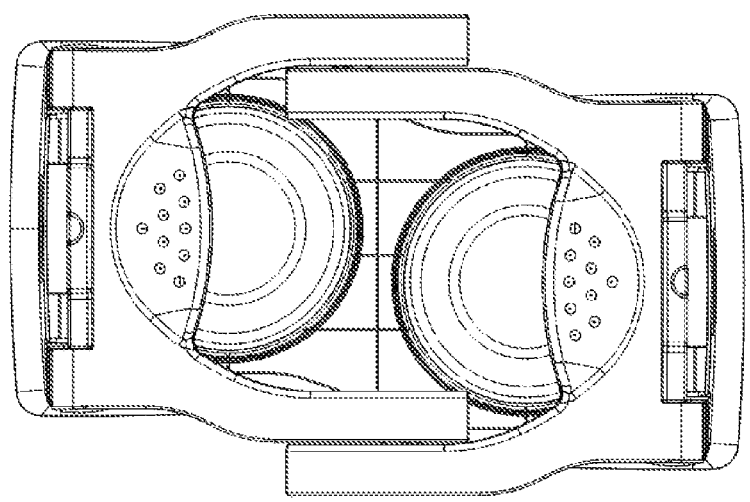
Figure 5:
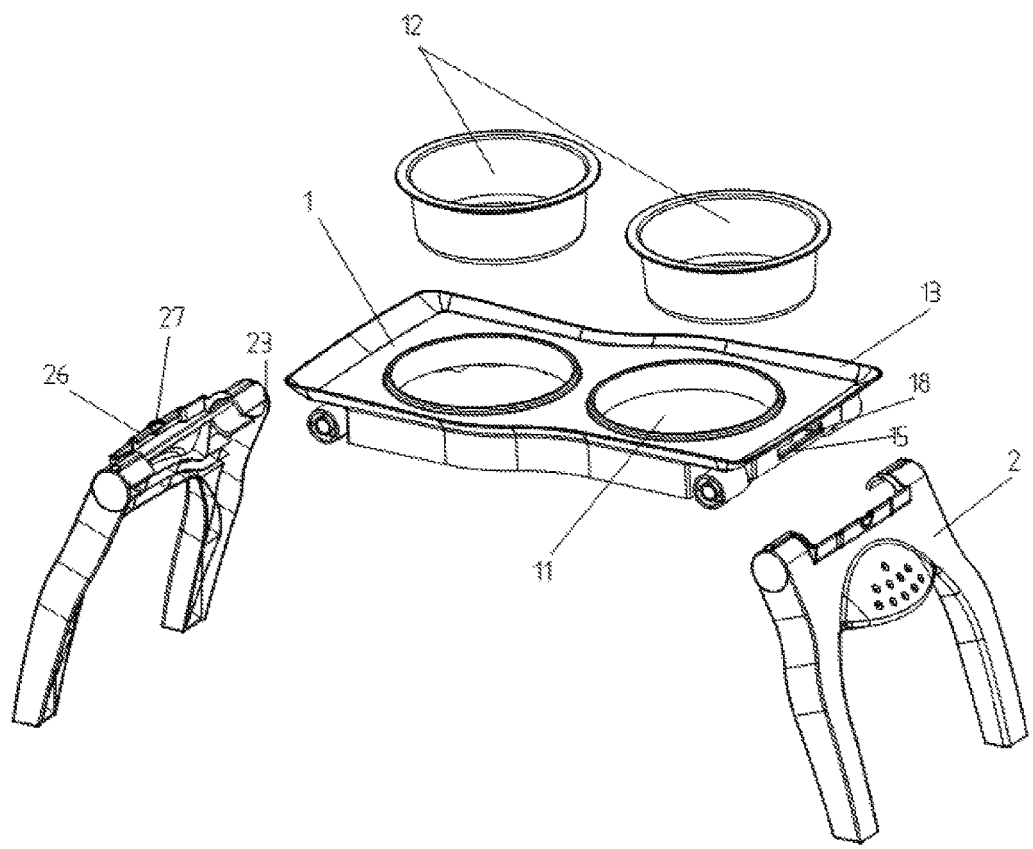
FIG. 5 and FIG. 6 are both exploded structure diagrams according to an embodiment of the disclosure.

As shown in FIG. 5, The tabletop 1 is made from a plastic material, two feeding bowl placement holes 11 are formed in the tabletop 1, and are arranged to place feeding bowls 12, and the placement holes 11 may be through holes, may also be blind holes, and are required to be matched with additional feeding bowls for use when being through holes. As shown in FIG. 3, A shape of the tabletop is similar to an "S" shape in plan view, so that the left and right bowls 12 placed in the placement holes 11 may be staggered by a certain position. A purpose of such a design is to increase lengths of the table legs: a pet dining table is usually designed to be relatively high for comfortable feeding of a pet, and for meeting the height and simultaneously avoiding mutual interference of the table legs which are folded, a length of the tabletop is required to be designed to be relatively large, which, however, causes an excessively large size of the whole dining table and is unfavorable for stability of the dining table because of an excessively large span; designing the tabletop 1 to be similar to the "S" shape may ensure the height of the dining table, ensure the length and reduce the size as much as possible, As shown in FIG. 4, the table legs may be mutually staggered without mutual interference when being folded; and moreover, positions of the two feeding bowl placement holes 11 are staggered, which is equivalent to increase of a width of the dining table 1, so that stability in use is higher.

Figure 6:
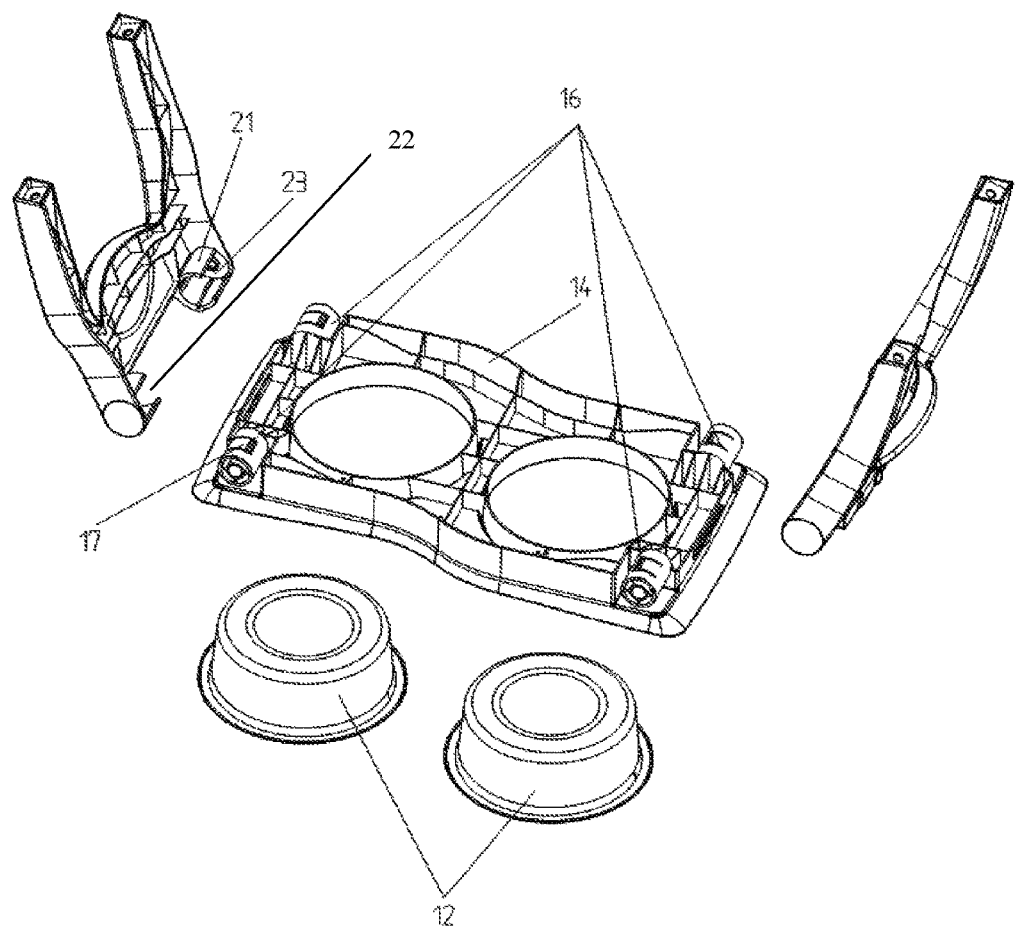

An upper surrounding edge 13 which protrudes upwards is arranged along a periphery of an upper surface of the tabletop, and the upper surrounding edge 13 may prevent food from being splashed down to the ground when the pet is fed, and also has a function of a reinforcing rib to make the tabletop unlikely to be deformed. As shown in FIG. 6, a lower surrounding edge 14 which protrudes downwards is arranged along a periphery of a lower bottom surface of the tabletop 1, and the lower surrounding edge 14 has the function of the reinforcing rib to make the tabletop 1 more stable and unlikely to be deformed.

Two tabletop openings 18 are formed in left and right ends of the lower surrounding edge 14 respectively, and two ribs 15 which protrude outwards are arranged at the two tabletop openings 18 respectively.

Four male rotating shafts 16 are arranged in four corners of the lower surrounding edge 14 respectively, each male rotating shaft may have a structure of a shell, and an elastic male buckle 17 of which three edges are open is arranged at a lower part of each male rotating shaft 16.

Figure 8:
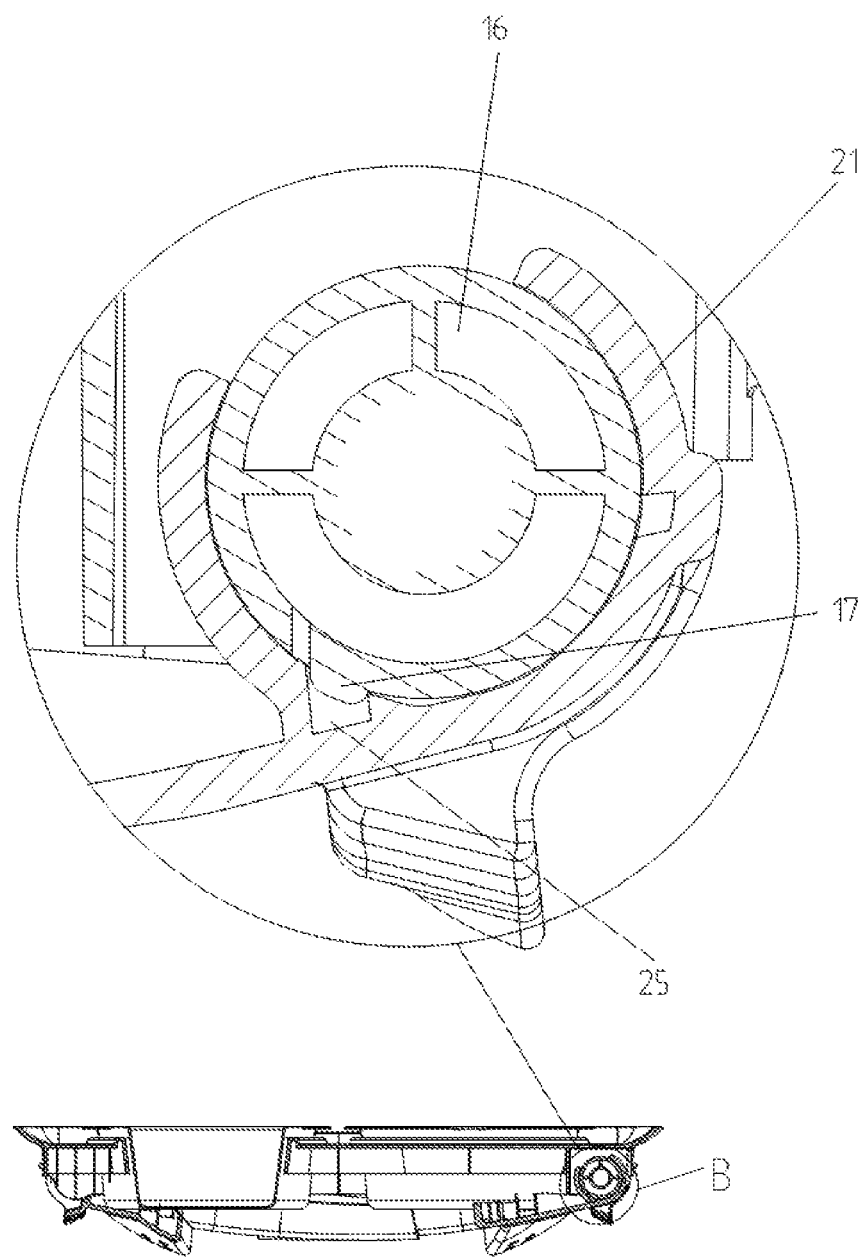
FIG. 8 is an enlarged structure diagram of a folded state and a part B thereof according to an embodiment of the disclosure.

As shown in FIG. 4, the two pairs of table legs 2 are also made from the plastic material, four female rotating shafts 21 corresponding to the four male rotating shafts 16 of the tabletop 1 are arranged at an upper part of the two pairs of table legs 2, each female rotating shaft 21 may have a structure of a semicircular shell, each semicircular shell is provided with a shell opening 22, and a width of each shell opening 22 is smaller than a diameter of a corresponding one of the male rotating shafts 16 of the tabletop, so that the two pairs of table legs 2 may be prevented from being separated after being mounted. Meanwhile, for easy mounting, a notch 23 is formed in a root of each semicircular shell, and the notches 23 have a function of improving elasticity of the semicircular shells to sleeve the male rotating shafts 16 of the tabletop with the female rotating shafts 21 of the two pairs of table legs. As shown in FIG. 8, a female buckle 25 is arranged in each female rotating shaft 21 of the two pairs of table legs, and each female buckle 25 is engageable with a corresponding one of the elastic male buckles 17 of the male rotating shafts 16 of the tabletop, and are arranged to lock the two pairs of table legs which are folded, specifically as follows: after the two pairs of table legs 2 are folded, the elastic male buckles 17 fall to the female buckles 25 of the female rotating shafts of the two pairs of table legs, and the two pairs of table legs 2 are locked, and are required to be softly pulled with hands for unfolding.

Figure 7:
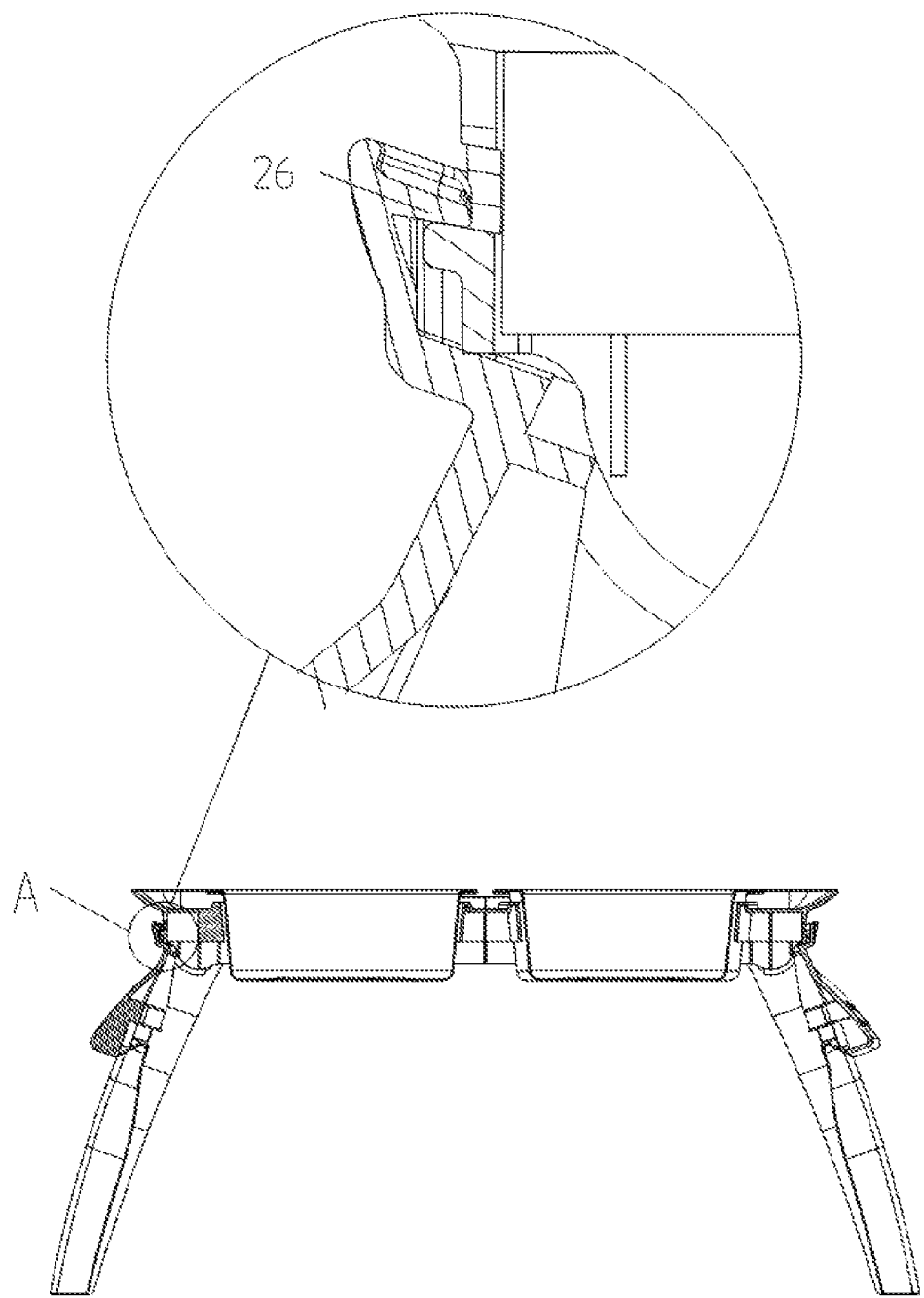
FIG. 7 is an enlarged structure diagram of an unfolded state and a part A thereof according to an embodiment of the disclosure.

As shown in FIG. 7, A locking buckle 26 corresponding to each of the two tabletop openings of the lower surrounding edge 14 is arranged between the two female rotating shafts 25 of each pair of table legs 2, the two locking buckles 26 are buckled to the two outwardly protruding ribs 15 at the two tabletop openings of the lower surrounding edge at a bottom of the tabletop respectively by virtue of elasticity of plastics when the two pairs of table legs 2 are unfolded, and the two pairs of table legs 2 which are locked may not sway, thereby ensuring stability of the dining table. As shown in FIG. 5, a fastener position 27 is arranged in the middle of each locking buckle 26, and a function of the fastener positions 27 is that the fastener positions 27 are pulled with hands of a user to elastically deform the plastics when the two pairs of table legs 2 are required to be folded and the locking buckles 26 are separated from the ribs 15 to fold the two pairs of table legs 2.

The invention claimed is:

1. An S-shaped folding pet dining table, comprising a tabletop made from a plastic material; and two pairs of table legs mounted at bottoms of left and right ends of the tabletop respectively and capable of being folded in a staggered position, wherein top of the tabletop is lying on a horizontal plane, the tabletop is bent in an S shape in plan view, and at least two feeding bowl placement holes are formed in the tabletop in a staggering manner conforming to bending of the S shape of the tabletop; and the two pairs of table legs are both positioned outside front and rear side edges of the tabletop after being oppositely folded, and the two pairs of table legs are staggered to conform to the bending of the S shape of the tabletop to increase a height of the dining table on a premise of not increasing a length of the tabletop;

four male rotating shafts are arranged in four corners of a lower part of the tabletop respectively, each male rotating shaft has a structure of a shell, and an elastic male buckle of which three edges are open is arranged at a lower part of each male rotating shaft;

four female rotating shafts corresponding to the four male rotating shafts of the tabletop are arranged at an upper part of the two pairs of table legs respectively, each female rotating shaft has a structure of a semicircular shell with a shell opening, a width of each shell opening is smaller than a diameter of a corresponding one of the male rotating shafts, a female buckle is arranged in each female rotating shaft, and each female buckle is engageable with a corresponding one of the elastic male buckles of the male rotating shafts, and the elastic male buckles and the female buckles are arranged to lock the two pairs of table legs in a folded position;

a lower surrounding edge which protrudes downwards is arranged along a periphery of a lower bottom surface of the tabletop, and the four male rotating shafts are arranged in four corners of the lower surrounding edge respectively;

two tabletop openings are formed in left and right ends of the lower surrounding edge respectively, and two ribs which protrude outwards are arranged at the two tabletop openings respectively; and a locking buckle corresponding to each of the two tabletop openings of the lower surrounding edge is arranged between the two female rotating shafts at each pair of table legs, and the two locking buckles are arranged to be buckled to the two outwardly protruding ribs of the lower surrounding edge respectively when the two pairs of table legs are unfolded.

2. The S-shaped folding pet dining table according to claim 1, wherein an upper surrounding edge which protrudes upwards is arranged along a periphery of an upper surface of the tabletop.

3. The S-shaped folding pet dining table according to claim 1, wherein a fastener position is arranged in a middle of each locking buckle, and is arranged to be pulled with a hand of a user to separate the locking buckle from a corresponding one of the ribs to fold the two pairs of table legs when the two pairs of table legs are required to be folded.

4. The S-shaped folding pet dining table according to claim 1, wherein a notch is formed in a root of each semicircular shell to improve elasticity of the semicircular shells.

* * * * *